(12) United States Patent  (10) Patent No.: US 8,111,164 B2
Bryce  (45) Date of Patent: Feb. 7, 2012

(54) EMPLOYING MILLIMETER-WAVE ELECTROMAGNETIC ENERGY IN COLLISION AVOIDANCE

(75) Inventor: Michelle L. Bryce, Boerne, TX (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 266 days.

(21) Appl. No.: 11/973,988

(22) Filed: Sep. 25, 2007

(65) Prior Publication Data

US 2008/0210175 A1  Sep. 4, 2008

Related U.S. Application Data

(60) Provisional application No. 60/847,726, filed on Sep. 28, 2006.

(51) Int. Cl.
*G08B 23/00* (2006.01)
(52) U.S. Cl. .................. 340/573.2; 119/712
(58) Field of Classification Search .......... 340/573.2, 340/572.1, 573.3, 384.2; 43/124; 119/712, 119/720
See application file for complete search history.

(56) References Cited

U.S. PATENT DOCUMENTS

| | | | | |
|---|---|---|---|---|
| 5,214,411 A * | 5/1993 | Herbruck | ..................... | 340/573.2 |
| 5,424,551 A * | 6/1995 | Callahan | ......................... | 43/113 |
| 5,998,781 A | 12/1999 | Vawter et al. | | |
| 6,250,255 B1 * | 6/2001 | Lenhardt et al. | ........... | 340/384.2 |
| 6,832,081 B1 * | 12/2004 | Hiramatsu et al. | ............ | 455/328 |
| 2003/0090391 A1 | 5/2003 | Philiben et al. | | |
| 2004/0146352 A1 | 7/2004 | Carr et al. | | |
| 2005/0206525 A1 * | 9/2005 | Weilbacher, Jr. | ........... | 340/573.2 |
| 2009/0243881 A1 * | 10/2009 | Alon et al. | ..................... | 340/905 |
| 2009/0256706 A1 * | 10/2009 | Brown | .......................... | 340/552 |

OTHER PUBLICATIONS

Adams, Shoot to Not Kill, Popular Science, pp. 89-93, May 2003 available at http://www.popsci.com/popsci/science/64c7359b9fa84010vgnvcm1000004eecbccdrcrd.html and http://www.popsci.com/popsci/science/40b7359b9fa84010vgnvcm1000004eecbccdrcrd.html.
Hackett and Beason, "Active Denial Technology," Air Force Research Laboratory document DE-01-01, available at http://www.afrlhorizons.com/Briefs/Sept01/DE0101.html.
McCullough, "Active Denial Technology (ADT)," briefing slides and narrative presented at Homeland Security and Force Protection Science and Technology Conference, Aug. 7-8, 2002, at Fort Leonard Wood, MO.

(Continued)

*Primary Examiner* — John A Tweel, Jr.
(74) *Attorney, Agent, or Firm* — AFMCLO/JAZ; Fredric Sinder

(57) ABSTRACT

One example of a solution provided here comprises: identifying a location of one or more animals that are on a path to collide with a vehicle or device; directing millimeter-wave electromagnetic energy toward the location; and administering an effective amount of the electromagnetic energy to repel the animals. Another example comprises: identifying a location of one or more animals that are in a vehicle's path; directing millimeter-wave electromagnetic energy toward the location; and administering an effective amount of the electromagnetic energy to repel the animal, thereby avoiding a collision between the animal and the vehicle. The vehicle could be an aircraft, for example, or another kind of vehicle. Examples in the aviation context involve moving birds or mammals away from runways and taxiways, or otherwise repelling birds that are in the path of an aircraft.

9 Claims, 2 Drawing Sheets

OTHER PUBLICATIONS

Murphy et al., Bioeffects Research in Support of the Active Denial System (ADS): A Novel Directed Energy Non-Lethal Weapon, in Non-Lethal Capabilities Facing Emerging Threats, Fraunhofer Institut Chemische Technologie, Ettlingen, Germany, pp. 23.1-23.15, 2003.

Sandia National Laboratories, Team Investigates Active Denial System for Security Applications, Jun. 30, 2005, available at http://www.sandia.gov/news/resources/releases/2005/def-nonprolif-sec/active-denial.html.

U.S. Air Force, Active Denial System Advanced Concept Technology Demonstration, Sep. 2005, available at http://www.de.afrl.af.mil/FactSheets/ActiveDenial.pdf.

U.S. Air Force, Nonlethal Technology Going Airborne, DE Release No. 2004-46, Oct. 4, 2004, available at http://www.de.afrl.af.mil/News/04-46.pdf.

U.S. Dept. of Defense Joint Non-Lethal Weapons Directorate, Active Denial System (ADS) Fact Sheet, Sep. 2005.

U.S. Dept. of Defense Joint Non-Lethal Weapons Directorate, Active Denial System: A Non-Lethal Weapon for the 21st Centrury Warfighter, briefing slides presented at Directed Energy Weapons 2006 conference, London, England, Jan. 24, 2006.

* cited by examiner

US 8,111,164 B2

EMPLOYING MILLIMETER-WAVE ELECTROMAGNETIC ENERGY IN COLLISION AVOIDANCE

RELATED APPLICATION, AND RIGHTS OF THE GOVERNMENT

This application claims the benefit under 35 U.S.C. §119(e) of provisional Patent Application Ser. No. 60/847,726, filed Sep. 28, 2006, the entire text of which is incorporated herein by reference.

The invention described herein may be manufactured and used by or for the Government of the United States for all governmental purposes without the payment of any royalty.

BACKGROUND OF THE INVENTION

The invention relates to hazard-avoidance systems and methods and, more particularly, systems and methods of avoiding a collision involving an animal.

Collisions involving vehicles and animals threaten human safety, cause property damage, and kill wildlife. Conventional solutions include building fences, hunting or harassing animals, or eradicating their habitat in the aviation environment. However, a costly and dangerous collision problem persists. For example, the U.S. Air Force estimates that bird strikes cause over $54 million in damage to aircraft yearly and threaten aircrew safety.

Thus there is a need for collision-avoidance solutions that are more effective and less labor-intensive.

SUMMARY OF THE INVENTION

One example of a solution provided here comprises: identifying a location of one or more animals that are on a path to collide with a vehicle or device; directing millimeter-wave electromagnetic energy toward the location; and administering an effective amount of the electromagnetic energy to repel the animals. Another example comprises: identifying a location of one or more animals that are in a vehicle's path; directing millimeter-wave electromagnetic energy toward the location; and administering an effective amount of the electromagnetic energy to repel the animal, thereby avoiding a collision between the animal and the vehicle. The vehicle could be an aircraft, for example, or another kind of vehicle. Examples in the aviation context involve moving birds or mammals away from runways and taxiways, or otherwise repelling birds that are in the path of an aircraft.

DETAILED DESCRIPTION

Examples here involve 94-96 GHz millimeter-wave electromagnetic energy, but other frequencies may be used. The U.S. Military is considering the use of 94-96 GHz millimeter wave (MMW) electromagnetic energy in a stand-off, non-lethal application in which the energy density is beamed onto humans at a distance in a controlled manner, so as to raise the skin temperature to a level that is uncomfortable but not damaging. This technology is known as "Active Denial." The 94-96 GHz energy is absorbed in the first 0.3 mm in the skin where, at sufficient intensities, it causes near-instantaneous heating, resulting in intolerable heating sensation, forcing the target to flee. Background information is provided by Hackett and Beason, "Active Denial Technology," Air Force Research Laboratory document DE-01-01, available at http://www.afrlhorizons.com/Briefs/Sept01/DE0101.html (hereby incorporated by reference). See also Murphy et al., Bioeffects Research in Support of the Active Denial System (ADS): A Novel Directed Energy Non-Lethal Weapon, in Non-Lethal Capabilities Facing Emerging Threats, Fraunhofer Institut Chemische Technologie, Ettlingen, Germany, pages 23.1-23.15, 2003 (hereby incorporated by reference).

Until now, the Active Denial System has been developed as a military weapon for use against humans. However, in novel examples described below, millimeter-wave electromagnetic energy repels non-human animals, thereby avoiding collisions between animals and vehicles. The repelling effect of millimeter-wave electromagnetic energy may act at long distances, so this effect may be exerted in large spaces around airfields or along railways or highways, for example.

Figure 1:
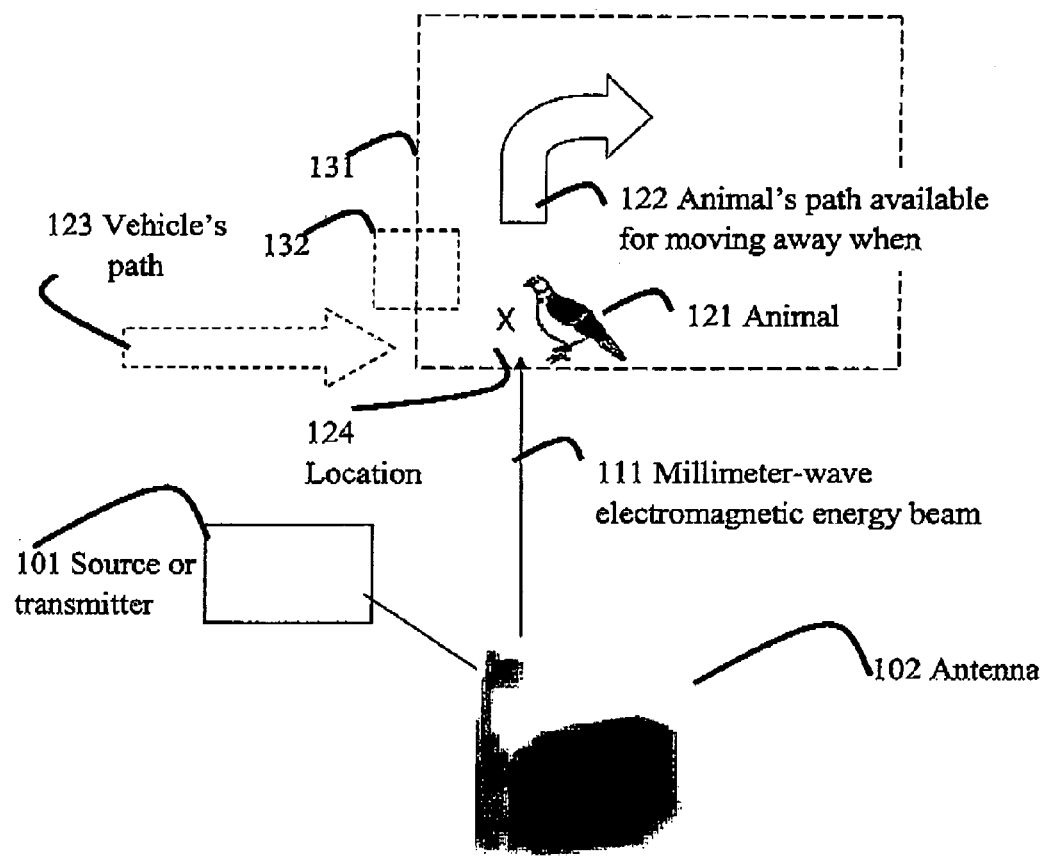
FIG. 1 is a simplified block diagram, illustrating an example of a method and system of avoiding a collision, according to the teaching of the present invention.

FIG. 1 illustrates an example of a method of avoiding a collision. In general, the example comprises: identifying a location X (at 124) of one or more animals (121) that are in a vehicle's path (represented by arrow 123) (the vehicle could be an aircraft, for example, or another kind of vehicle); directing millimeter-wave electromagnetic energy (represented by arrow 111) toward location X; and administering an effective amount of the electromagnetic energy to repel the animal; thereby avoiding a collision between the animal and the vehicle. The animal's path is represented by arrow 122. This path is available to the animal 121 for moving away when repelled by millimeter-wave electromagnetic energy (111) from source or transmitter (101), directed through antenna (102). "Millimeter-wave electromagnetic energy" means any electromagnetic energy in the millimeter-wave region of the electromagnetic spectrum (defined herein to be electromagnetic energy at wavelengths less than about 10 millimeters). "Vehicle" means any craft, conveyance, or means of transportation.

In the aviation context, the example illustrated in FIG. 1 involves moving birds or mammals (121) away from runways and taxiways at location X (124), or otherwise repelling birds that are in the path (123) of an aircraft. Source or transmitter (101) may, for example, be mounted on an aircraft.

In various implementations of the method, directing millimeter-wave electromagnetic energy may further comprise employing a single focus, a sweeping pattern, or a tracking mode (to follow birds until they are out of the vehicle's path, for example).

Figure 2:
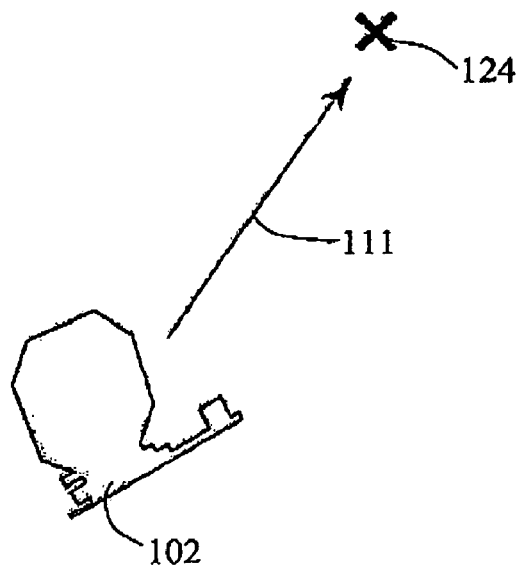
FIG. 2 is a perspective view of the antenna projecting a focused beam of millimeter wave electromagnetic wave energy at location X.
Figure 3:
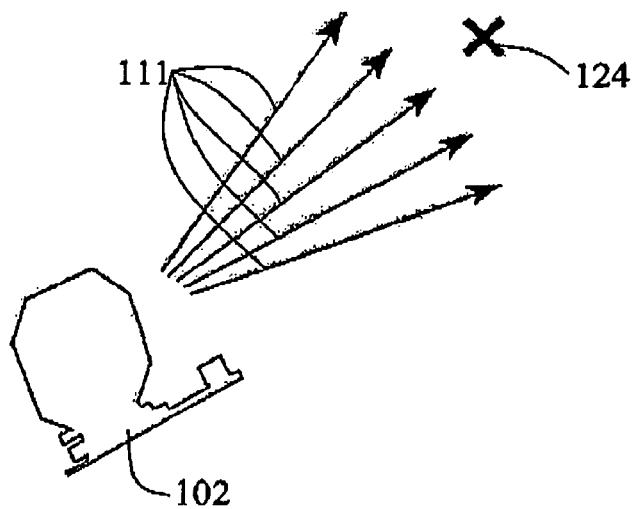
FIG. 3 is a perspective view of the antenna projecting a sweeping beam of millimeter wave electromagnetic wave energy at location X.

FIG. 2 illustrates the single focus beam for directing millimeter-wave electromagnetic energy (111) from the antenna (102) to the location X (124). FIG. 3 illustrates the sweeping pattern beam for directing millimeter-wave electromagnetic energy (111) from the antenna (102) to the location X (124).

Source (101) and antenna (102) may, for example, be mounted on an aircraft, a land vehicle, the ground or a tower (not shown in FIG. 1). Various implementations of the method may further comprise automatically activating a source (101) when the vehicle approaches the location X (124); or the animal is detected at the location X (124); or both.

FIG. 1 also illustrates an example of a system of avoiding a collision, comprising means (e.g. source 101 and antenna 102) for administering an effective amount of millimeter-wave electromagnetic energy (111) to repel one or more animals (121) that are in a vehicle's path (123). A system may further comprise means for employing a single focus for millimeter-wave electromagnetic energy (111), or a sweeping pattern, or tracking.

A system may, for example, further comprise means for mounting source 101 and antenna 102 on an aircraft, a land vehicle, the ground or a tower (not shown in FIG. 1). A system may further comprise a control loop automatically activating a source (101) when the vehicle approaches the location X (124); or the animal is detected at the location X (124); or both. For example, the animal's presence triggers a sensor at the location X (at 124); and the sensor activates a source (101).

To find location X, a boresighted low-light video camera and thermal imager are mounted on the antenna. The operator maneuvers the antenna with a joystick and depresses a trigger to fire the beam. Since the operator sees the target and surrounding area, he knows exactly what the beam will hit when he fires it. The atmosphere slightly absorbs the millimeter-wave beam and heavy rain can degrade performance. These effects are not considered important, however, since the operator must see the target to engage it.

In developing the Active Denial System as a weapon for use against humans, a repelling effect of millimeter-wave electromagnetic energy has been demonstrated in rats, goats, non-human primates, and humans, but not birds until now. FIG. 1 also illustrates an example of proof-of-concept experiments, with some experimental components represented by boxes with broken lines: anechoic chamber (131) and key peck device (132). This example involves experiments to determine if millimeter wave (MMW) electromagnetic energy is effective at non-injurious repelling of birds. Eighteen pigeons (Male, *Columba livia*) are trained to peck at a lighted disc (132) for food reward (variable ratio schedule) in a standard operant chamber, and then in an anechoic exposure chamber (131) in a MMW—transparent operant cage with sufficient room (30 cubic feet) for the birds to escape (arrow 122) the 94-96 GHz beam (111). For example a first experiment may determine the operating parameters required to repel the birds without injury, and a second experiment may validate disruption of a trained behavior, repelling, by the 94-96 GHz beam (111). For example, a laboratory set up may use a 94-96 GHz, 1 kilowatt source (101). The distance from the antenna (102) to the location X (124) may be at various distances, not to exceed about 15 Joules/cm$^2$ on target. This may be slightly refined during the experiment.

A laboratory test of 95 GHz to repel birds was conducted under an approved animal research protocol (reference Animal Research Proposal FBR-2005-0013A, "Use of Millimeter Wave Technology (95 GHz) to Repel Birds", Principal Investigator Jon Klauenberg). The purpose of this study was to determine if 94-96 GHz MMW electromagnetic energy is effective in interrupting a bird's trained behavior, causing them to move out of the beam. Eighteen birds were tested at 5 different levels of power density. Twelve of the birds demonstrated disruption of behavior and/or repel, that is, they ruffled their feathers, turned away from the pecking device, and moved backwards a distance away from the key peck device. Effect was proportional to power density. At higher levels of power density, the repel effect was more consistent. The same transmitter and chamber used in this experiment was also used in previous experiments conducted on humans and rats. Overall, the bird experiment required more energy density for repel than it took with the humans and rats. The power density required did not exceed 15 Joules/cm$^2$. None of the birds were injured by the MMW.

A system designed for flight line use will utilize a different antenna size, power density level, etc. This will depend on whether the system will be used immediately on the flight line, on a final approach path, or alternate locations. For example, a system for use at an airfield may be similar to the ground-based Active Denial System demonstrator system that was packaged in a metal shipping container. In this example, the source (101) is a 94-96 GHz, 100 kW gyrotron, which uses a cryogen free superconducting magnet. The antenna (102) is a flat aperture parabolic surface (FLAPs) antenna, consisting of millions of tiny electrical dipole elements on a flat surface. Geometrically it is a flat surface, but electromagnetically it is a very precise and highly accurate parabolic surface. The distance from the antenna (102) to the location X (124) may be at least beyond the range of small arms fire. Background information is provided by William F. McCullough's briefing slides and narrative, "Active Denial Technology (ADT)," presented at Homeland Security and Force Protection Science and Technology Conference, 7-8 Aug. 2002, at Fort Leonard Wood, Mo. (hereby incorporated by reference). See also Adams, "Shoot not to Kill," Popular Science, pages 89-93, May 2003 (hereby incorporated by reference).

In summary, the examples given here employ millimeter-wave electromagnetic energy in collision avoidance. In a general sense, FIG. 1 illustrates identifying a location X (at 124) of one or more animals (121) that are on a path to collide with a vehicle or device; directing millimeter-wave electromagnetic energy (111) toward the location; and administering an effective amount of the electromagnetic energy to repel the animals. Such solutions are applicable in any context where it is desirable to avoid collisions involving animals, and thus avoid death to humans or animals, and avoid damage to vehicles (such an aircraft or car) or damage to devices (such as an antenna or turbine). The examples provided herein are intended to demonstrate only some embodiments of the invention. Other embodiments may be utilized and structural changes may be made, without departing from the present invention.

I claim:

1. A method for avoiding a collision, the method comprising the steps of:
 identifying a location of one or more birds that are on a path to collide with a vehicle;
 directing millimeter-wave electromagnetic energy between about 94 GHz and 96 GHz toward the location; and,
 administering an effective amount of the electromagnetic energy to repel the one or more birds.

2. The method according to claim 1, wherein the step of directing millimeter-wave electromagnetic energy further comprises employing at least one mode chosen from:
 a single focus mode;
 a sweeping mode; and,
 a tracking mode.

3. A system for avoiding a collision with a vehicle, the system comprising:
 a source of millimeter-wave electromagnetic energy;
 an antenna connected to the source;
 wherein activation of the system occurs when the source sends millimeter-wave electromagnetic energy to the antenna;
 wherein the antenna projects a beam of millimeter-wave electromagnetic energy between about 94 GHz and 96 GHz to a location;

wherein the location is a specific area in space; and, wherein the system administers an effective amount of millimeter-wave electromagnetic energy to produce a heat induced sensation to repel one or more birds at the location to avoid a collision with the vehicle.

4. The system for avoiding a collision according to claim 3, wherein the beam is a focused pattern of millimeter-wave electromagnetic energy.

5. The system for avoiding a collision according to claim 4, further comprising:

a sensor configured to monitor the location by observation;

wherein observation includes the visible light frequency spectrum; and, the sensor activates the system when at least one of the vehicle and the bird approaches the location.

6. The system for avoiding a collision according to claim 4, further comprising:

a sensor configured to monitor the location by observation;

wherein observation includes the infrared frequency spectrum; and, the sensor activates the system when at least one of the vehicle and the bird approaches the location.

7. The system for avoiding a collision according to claim 3, wherein the beam is a sweeping pattern of millimeter-wave electromagnetic energy.

8. The system for avoiding a collision according to claim 7, further comprising:

a sensor configured to monitor the location by observation;

wherein observation includes the visible light frequency spectrum; and, the sensor activates the system when at least one of the vehicle and the bird approaches the location.

9. The system for avoiding a collision according to claim 7, further comprising:

a sensor configured to monitor the location by observation;

wherein observation includes the infrared frequency spectrum; and, the sensor activates said system when at least one of the vehicle and the bird approaches the location.

* * * * *